United States Patent [19]

Burnett

[11] 4,151,555
[45] Apr. 24, 1979

[54] OPTICAL SCANNING AND ENCODING DEVICE

[75] Inventor: James E. Burnett, Xenia, Ohio

[73] Assignee: The Mead Corporation, Dayton, Ohio

[21] Appl. No.: 854,803

[22] Filed: Nov. 25, 1977

[51] Int. Cl.² ............................................. H04N 1/46
[52] U.S. Cl. ..................................... 358/75; 358/256; 358/280
[58] Field of Search ............... 358/256, 263, 280, 294, 358/75

[56] References Cited
U.S. PATENT DOCUMENTS

| | | | |
|---|---|---|---|
| 1,790,723 | 2/1931 | Ranger | 428/195 |
| 1,973,726 | 9/1934 | Ranger | 428/195 |
| 2,804,574 | 8/1957 | Kingsbury | 315/157 |
| 2,962,545 | 11/1960 | Dillenburger | 358/41 |
| 3,373,437 | 3/1968 | Sweet et al. | 346/75 |
| 3,528,749 | 9/1970 | Bowker | 356/433 |
| 3,580,995 | 5/1971 | Klensch | 358/283 |
| 3,604,846 | 9/1971 | Behane et al. | 358/263 |
| 3,928,718 | 12/1975 | Sagae et al. | 358/296 |

*Primary Examiner*—Richard Murray
*Attorney, Agent, or Firm*—Biebel, French & Nauman

[57] ABSTRACT

An optical scanning and encoding device for providing a print signal pulse train to an ink jet printer in which a master image, including a reference image area, is scanned along a scan line. An optical scanner scans the master image and provides a signal which is inversely related to the print density of the image along the scan line. An integrator integrates the density signal during receipt of a gating signal pulse. A level detector detects when the integrator output has reached a predetermined level and provides a pulse to the printer and to an integrator reset circuit. A reference level means, responsive to scanning the reference image area, provides a signal output indicative of the maximum print density in the master image. A tachometer provides tachometer pulses at a frequency proportional to the rate at which the master image is scanned along the scan line. Means are responsive to the output of the reference level means and to the tachometer means for providing gating signal pulses to the integrator means, which pulses are of a frequency proportional to the tachometer pulses. Each of the gating signal pulses is inversely proportional in duration to the output of the reference level. The pulse signal to the printer is therefore compensated for fluctuation in the rate at which the master image is scanned and also for fluctuations in the optical path of the scanning means.

11 Claims, 1 Drawing Figure

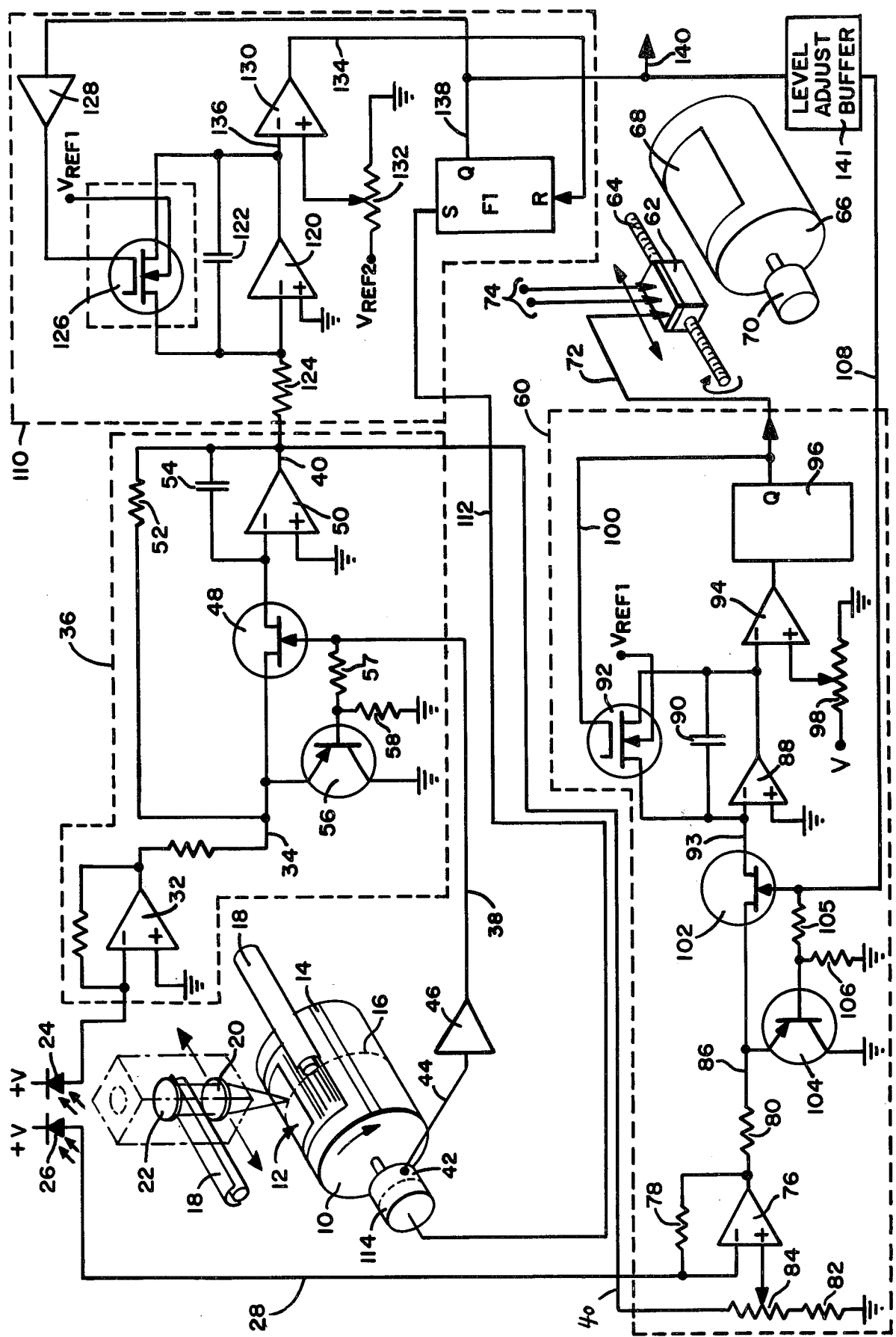

OPTICAL SCANNING AND ENCODING DEVICE

BACKGROUND OF THE INVENTION

The present invention relates to optical encoders and, more particularly, to encoders which may be used to provide print control information in an ink jet copier for copying all types of materials, including printed text and photographs, and which is particularly useful in multiple color printing operations. In recent years, ink jet printing has developed in sophistication to the point where it is now possible to print both text material and other types of material, such as photographs, with a high degree of resolution. A technique similar to halftone printing is used to reproduce photographs and other graphics. The photograph is reproduced by depositing ink drops closely together in areas which are to be dark in tone and further apart in areas which are to be lighter in tone. In a color printing arrangement, drops of red, yellow, and blue ink are deposited on the copy paper with the spacing between drops of each color ink being dependent upon the color content of the image in the area being reproduced.

In order to utilize an ink jet printer as the printing mechanism for the copier, it is necessary to have some method of scanning the master to produce print control information which will space the ink drops apart by the necessary distance to reproduce the master. When printing with multiple colors of ink, it is necessary that the master be scanned, generally by using color filters, as to the color content of each color of ink being printed. The final multicolor copy is produced by superimposing the printed images which result from scanning the master with respect to its color content for each color of ink being used.

It is known in the prior art to scan optically a master by illuminating the master and then, by some arrangement, directing the reflected light from along a scan line on the master image to one or more optical lenses which, in turn, direct the light to a photoelectric transducer. The output from the photoelectric transducer provides an indication of the printed material along the scan line of the master, with more light being reflected from the lighter toned areas, indicating little or no ink deposits in these areas.

In order to provide scanning for a particular color, a color filter is inserted in the optical system which passes only light of a preselected frequency range. The color scanning will usually be substracted—i.e., the color filters in the optical scanner block out the color being scanned. If, for instance, red is being scanned in the master and a red portion of the image is encountered, the light reflected from the master image will be of wavelengths principally that are in the red region of the light spectrum, with the balance of light being absorbed by the master. The color filter will block out the red spectrum light, permitting light of other wavelengths to pass. A large amount of light striking a photoelectric transducer in the optical scanning system will, therefore, indicate that a region having a small amount of red color content is being scanned. On the other hand, when very little light is directed to the photoelectric transducer, this will indicate that the red content of the area being scanned is significant. It is usual then to substract the output from the photoelectric transducer from a reference level to produce a signal directly related to the color content in the master image of the color being scanned.

Several problems have been noted with respect to prior art scanning devices. It has been found that the optical path alternation in a scanner will vary over a period of time for one of a number of reasons. If the supply voltage to the lamps which illuminate the master image should fluctuate, the intensity of the light directed to the photoelectric transducer, and therefore the magnitude of the electrical signal produced thereby, will fluctuate. Additionally, when a number of colors are being scanned in the master image by a scanner in which filters of various color transmitting characteristics are sequentially inserted into the optical path, the amount of light falling upon the photoelectric transducer will vary in dependence upon the light transmitting characteristics of each of the filters being used. It is not possible to obtain a set of filters of various colors which are perfectly matched in their light transmitting characteristics.

Another problem which has been noted is the image distortion which results from fluctuations in the speed at which the master image is scanned. If, for instance, the master image is mounted on a rotating drum and the drum rotated past the scanner, it is apparent that fluctuations in drum speed will distort the scanned signal. A straight line which is transverse to the direction of scanning may, as a consequence, be printed as a wavy line if the scanning drum rotation fluctuation is sufficiently severe.

Thus, it is seen that there is a need for a scanner for use with an ink jet printer copier in which variations in the rate at which the master image is scanned are detected and compensated and, further, in which variations in the light transmitting characteristics and transducing characteristics of the optical scanner are compensated.

SUMMARY OF THE INVENTION

An optical scanning and encoding device for providing a print signal pulse train to an ink jet printer, in which a master image, including a reference image area, is scanned along a scan line and a print signal pulse train generated for a predetermined color of ink, includes a tachometer which provides tachometer pulses in synchronism with scanning of the master image along the scan line. An optical scanning means for illuminating the master image provides light which is reflected from the image and which is inversely related in intensity to the color content of the predetermined color being scanned along the scan line on the master image. The light from the optical scanning means is received by an image scanning photodiode means and a reference photodiode means which provide electrical output signals directly related to the intensity of the light. A reference pulse means provides a reference pulse as the optical scanning means scans the reference image area. A sample and hold means is connected to the reference photodiode means and is also responsive to the reference pulse. The sample and hold means samples and stores the output signal from the reference photodiode means upon receipt of a reference pulse and provides a reference level at its output. A timing means is responsive to the output of the sample and hold means and to tachometer pulses and provides a gating signal pulse train which is equal in frequency to the tachometer pulses and which has pulses of a duration inversely proportional to the output of the sample and hold down. An encoder means is responsive to the output from the image scanning photodiode means for providing a print signal.

The encoder means includes a summer means for subtracting the output of the image scanning photodiode means from the reference level output of the sample and hold means to produce a color signal directly related to the content of the predetermined color along the scan line of the master image. The encoder means further includes an integrator means which is responsive to the summer means and to the timing means for integrating the output of the summer means during receipt of each pulse in the gating signal pulse train. Finally, the encoder means includes a level detector means for detecting when the output from the integrator means reaches a predetermined level and for providing a print signal pulse to the ink jet printer and a reset pulse to the integrator means in response to this predetermined level being reached.

Accordingly, it is an object of the present invention to provide a scanning and encoding device in which fluctuations in the optical path and photoelectric transducer are compensated; to provide such a scanning and encoding device in which fluctuations in the speed of scanning of the master image are compensated; and to provide such a scanning and encoding device in which both amplitude and timing compensation is effectuated immediately.

Other objects and advantages of the present invention will become apparent from the following description, the accompanying drawings and the appended claims.

BRIEF DESCRIPTION OF THE DRAWINGS

The FIGURE is a combination of a diagrammatic perspective representation of a scanner and a printer and a schematic of the circuitry of the scanning and encoding device of the present invention.

DETAILED DESCRIPTION OF THE PREFERRED EMBODIMENT

Reference is made to the single FIGURE in which a copier is diagrammatically illustrated embodying the scanning and encoding circuit of the present invention. A drum 10 has mounted on its surface a master image 12 which includes a white reference image area 14, the purpose of which will be described below. The master image 12 is scanned along a scan line, shown diagrammatically at 16, by an optical scanner transducer means which includes an optical scanning means for illuminating the master image, as by lamps 18. The optical scanning means also includes a lens 20 and a color filter 22 which direct light reflected from the master image 12 to a reference photodiode means 24 and an image scanning photodiode means 26. Although only a single, image scanning photodiode 26 is shown, it should be understood that a scanner will be most practically constructed by using a plurality of such photodiodes, with the lens arrangement 20 simultaneously directing light reflected from a plurality of parallel scan lines to the photodiodes. The drum 10 is rotated at a substantially uniform rate. As the drum is rotated, the optical scanning arrangement is moved relatively slowly in a direction parallel to the axis of rotation of the drum 10. It will be appreciated, therefore, that a new scan line will be defined across the master image 12 during each revolution of the drum 10 and, after a sufficient number of revolutions, the entire master image will have been scanned and encoded in a raster scanning format.

It will be appreciated that in a multicolor printing arrangement, the master image will be scanned repeatedly with different color filters 22 being inserted into the optical scanning means. Alternatively, scanning can be accomplished simultaneously with multiple scanning arrangements. The filter 22 will preferably comprise a filter which blocks out light of a wavelength corresponding to the predetermined color being scanned. The predetermined color will, therefore, be scanned in the following manner. If a portion of the master image 12 having a substantial amount of the predetermined color should be scanned, the light collected by lens arrangement 20 will be mostly of this wavelength. The filter 22 will block out this light and the image scanning photodiode 26 will receive very little light from the optical scanning means. A relatively small output will be provided, therefore, on line 28, thus indicating a substantial amount of the predetermined color in the content of the image along the scan line. When, on the other hand, an area on the master image 12 is scanned which is of a different color, the light collected by lens 20 will pass through the filter 22 relatively attenuated and strike the photodiode 26. The relatively large output on line 28 will, therefore, indicate a small amount of the predetermined color in the image along the scan line. It is seen, therefore, that the output of the image scanning photodiode 26 is inversely related to the print image density of the predetermined color being scanned on the master image. As used hereinafter, the "print image density" scanned on the master is a function of the amount of ink that must necessarily be deposited on the copy to reproduce the master image.

Light from the optical scanning means is simultaneously directed to the reference photodiode 24, which diode provides an output on line 30 which, also, is inversely related to the color content of the predetermined color being scanned along the scan line on the master image. The reference photodiode means is connected to inverting amplifier 32 which provides to line 34 a signal which is directly related to the color content of the master image.

A reference level sample and hold circuit 36 is responsive to the reference photodiode 24 upon receipt of a reference pulse on line 38. The sample and hold circuit samples the signal applied to line 34 and provides a reference level at its output 40. A reference pulse means includes a reference pulse tachometer 42 which provides a pulse on line 44 once during each revolution of drum 10 as the reference image area 14 is scanned. A gate driver circuit 46 receives these periodic pulses and provides at its output, on line 38, a pulse train of positive going pulses having a maximum potential of zero volts during the scanning of the reference image area 14. When this occurs, the FET 48 will be switched ON and the output on line 34 from the reference diode 24 will be applied to the negative input of amplifier 50.

Amplifier 50, resistor 52, and capacitor 54, form a storage means which provides at output 40 a reference level determined by the input on line 34 via FET 48. FET 48 is only switched ON during the scanning of reference image area 14 and, thus, the output 40 will provide, for the balance of the rotation of the drum 10, an indication of the light level sensed during scanning of this portion of the master image. Transistor 56 and resistors 57 and 58 are connected to ground line 34 except when the reference image area 14 is being scanned, so that there will be no leakage current across the FET 48.

Since, as previously mentioned, the reference image area 14 comprises a white strip, the light reflected from this area will include light of all wavelengths. The light directed to the reference photodiode 24 will, therefore, be the maximum amount which will be received by the diodes 24 and 26 during scanning of the master image 12. The electrical output from the reference photodiode 24 will also be the maximum which will be provided by a photodiode during scanning. If the lamps 18 should become reduced in their light output or if a filter having reduced light transmitting characteristics should be inserted in the optical scanner, the reference level provided at the output 40 of the sample and hold circuit will be correspondingly reduced. This reference level is monitored, as described below, to provide compensation for such amplitude fluctuation in the light received by the scanner.

An encoder means 60 is responsive to the output from the image scanning photodiode 26 to provide a print signal to an ink jet printer 62. Printer 62 is illustrated diagrammatically as mounted upon a threaded rotatable shaft 64 for movement in a direction which is parallel to the axis of rotation of copy drum 66. A sheet of copy paper 68 is mounted on drum 66 and the drum is rotated by servo motor 70 in synchronism with the rotation of drum 10. Alternatively, drums 10 and 66 may be mechanically interconnected and driven by the same motor device. Printer 62 is moved laterally across the copy paper 68 in synchronism with the movement of the scanning device across the master image 12. The ink jet eminating from printer 62 will, therefore, provide for printing on the paper 68 along a line corresponding to the scan line 16 on the master image.

The output from encoder 60 is provided on line 72 and additional ink jet control inputs 74 are also illustrated. It should be understood that if a plurality of jets are used simultaneously for printing on the copy paper 68, such jets would each be under the control of a separate encoder, substantially identical to the encoder 60. Each encoder would have its own image scanning photodiode mounted adjacent photodiode 26 for simultaneous receipt of light from image 12. The photodiodes would scan parallel scan lines across the master image 12.

Ink jet printers of the type used in the present invention are well known in the prior art. Typical printers are illustrated in U.S. Pat. Nos. 3,701,998, issued Oct. 31, 1972, to Mathis; 3,586,907, issued June 22, 1971, to Beam et al; and 3,373,437, issued Mar. 12, 1968, to Sweet et al.

The encoder means 60 includes a summer means comprising amplifier 76, resistors 78, 80, and 82, and tapped resistance 84. The summer means substracts the output from the image scanning photodiode, on line 28, from the reference level output of the sample and hold means, which is provided on line 40. The output on line 40 is appropriately attenuated by resistors 82 and 84. It can be seen that the output signal of the summer on line 86 is, therefore, a difference signal which is directly related to the color density of the predetermined color in the master image along the scan line.

An encoding integrator means includes amplifier 88, capacitor 90, and MOSFET 92. The encoding integrator has a gating circuit at its input 93 providing selectively the signal from line 86 and controlling the time periods during which the encoding integrator means operates.

A level detector means includes a level detector 94 which provides a trigger signal to monostable multivibrator 96 when the output from the integrator reaches a predetermined level as set with resistor 98. When this predetermined level is reached, multivibrator 96 provides an output pulse on line 72 to the ink jet printer 62, thus causing a drop of ink to be deposited on the sheet of copy paper 68. At the same time, the multivibrator 96 provides a reset pulse to line 100, gating MOSFET 92 ON and discharging capacitor 90. When this occurs, the integrator means is reset and a new integration operation begins. Thus the frequency of the output pulses on line 72 is a function of the time taken by the encoding integrator means to reach a predetermined reference level and, in turn, this time is directly proportional to the input on line 86.

A signal is applied to the encoding integrator by a gating circuit, including FET 102 and transistor 104, only when a gating signal is supplied to line 108. As a consequence, the frequency of the output print signal pulse train on line 72 is also dependent on the amount of time that the signal from line 86 is applied to the encoding integrator means. A timing means 110 is responsive to the output 40 of the sample and hold means 36 and also to tachometer pulses on line 112 from tachometer 114. The timing means 110 provides a gating signal pulse train on line 108 which is equal in frequency to the tachometer pulses on line 112. However, the gating signal pulse train has pulses of a duration inversely proportional to the output of the sample and hold means 36.

The timing means 110 includes a timing integrator means comprising amplifier 120, capacitor 122, resistor 124, reset MOSFET 126 and drive 128. Additionally, the timing integrator means includes level detector 130 and resistor 132 which provide an output on line 134 when the integrator output on line 136 exceeds a preselected reference level. The integrator, including amplifier 120 and capacitor 122, will integrate the output from the sample and hold circuit 36 and, when a preselected reference level is reached, provide an output on line 134. Line 134 is connected to the reset input of flip-flop F1, while the set input of the flip-flop is connected to line 112 which receives tachometer pulses from tachometer 114. The output 138 of the flip-flop F1 is connected to gate driver 128 and also to line 108.

When a pulse is received on line 112, setting flip-flop F1, the pulse applied to line 138 will switch the MOSFET 126 OFF and an integration cycle will be initiated. The timing integrator will integrate at a rate which is proportional to the output of the sample and hold circuit 36. When the output of the timing integrator reaches the level set by level detector 130, the flip-flop F1 will be reset and, as a consequence, the gate including MOSFET 126 will be turned ON and capacitor 122 discharged. The timing means 110 will, thereafter, await the receipt of the next tachometer pulse on line 112.

The timing integrator is adjusted to have identical characteristics to the encoding integrators in the data channels associated with each of the scanning photodiodes. This is done so that if an encoding integrator is receiving a maximum signal it will integrate at the same rate as the timing integrator and provide a pulse output to the printer at the trailing edge of the pulse in the gating signal pulse train on line 108. These gating signal pulses will also be applied via line 140 to the encoding integrators associated with the additional image scanning photodiodes, if such additional photodiodes are used in the scanner. A level adjustment buffer 141 receives the pulses from flip-flop F1 and adjusts the voltage level of the pulse train such that it will consist of positive-going pulses having a maximum voltage level of zero volts. Switching of transistor 104 and FET 102 will thereby be appropriately controlled.

Thus it is seen that the encoding integrator is gated ON once for each tachometer pulse on line 112 for a period of time which is inversely proportional to the maximum signal output from the sample and hold circuit 36. If the tachometer pulses should vary, resulting from fluctuations in the speed of rotation of drum 10, the data accumulated in the encoding integrator will be compensated to allow for these variations and the density of printing provided by the printer 62 will not show such variations. Thus the copier is compensated both for fluctuations in the optical scanning path and for variations in the speed of scanning of the master image.

It will be appreciated that many variations in the scanning and encoding circuit shown in the FIGURE may be made within the scope of the invention. An encoder arrangement may be provided in which fluctuations in the amplitude of the photodiode output are compensated without compensating for fluctuation in the speed of rotation of the drum. This could be accomplished, for instance, by substituting an oscillator circuit having a fixed frequency output in the timing circuit 110 with the duration of output pulses being varied in dependence upon the voltage output from the sample and hold circuit 36. Alternatively, a compensation could be provided for fluctuations in the speed of rotation of the drum 10, without compensating for amplitude variations. This could take the form of a simple gating circuit controlling the timing of pulses to the printer. In such an arrangement, the encoding integrator would operate on a continuous basis.

It should also be apparent that, while a drum scanning arrangement responsive to reflected light from a master image has been described above, other scanning arrangements could be used in the present invention. A transparency may, for instance, be scanned by directing light through the transparency. The master image may also be scanned along scan lines configured other than in a conventional raster format, provided the printer is capable of using print information so encoded. Many other such variations within the scope of the present invention will be apparent to one skilled in the art.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. An optical scanning and encoding device for providing a print signal pulse train to an ink jet printer in which a master image, including a reference image area, is scanned along a scan line for a predetermined color of ink, and a print signal pulse train generated, comprising:
    a tachometer for providing tachometer pulses in synchronism with scanning of said master image along said scan line,
    optical scanning means for illuminating said master image and providing light reflected therefrom which is inversely related in intensity to the color content of the predetermined color being scanned along the scan line on the master image,
    image scanning photodiode means and reference photodiode means positioned to receive light from said optical scanning means and to provide electrical output signals directly related to the intensity of the light,
    reference pulse means for providing a reference pulse as said optical scanning means scans said reference image area,
    sample and hold means, connected to said reference photodiode means and responsive to said reference pulse, for sampling and storing the output signal from said reference photodiode means upon receipt of a reference pulse and for providing a reference level at the output of said sample and hold means,
    timing means, responsive to the output of said sample and hold means and to tachometer pulses, for providing a gating signal pulse train equal in frequency to said tachometer pulses and having pulses of a duration inversely proportional to the output of said sample and hold means, and
    encoder means, responsive to the output from said image scanning photodiode means, for providing a print signal, including
        summer means for subtracting the output from said image scanning photodiode means from the reference level output of said sample and hold means to produce a color signal directly related to the content of said predetermined color along the scan line of said master image,
        integrator means, responsive to said summer means and to said timing means, for integrating the output of said summer means during receipt of each pulse in said gating signal pulse train, and
        level detector means for detecting when the output from said integrator means reaches a predetermined level and for providing a print signal pulse to said ink jet printer and resetting said integrator means in response thereto.

2. In a copier system in which a master image is scanned along a scan line and a copy of said master image simultaneously printed by an ink jet printer, a circuit for scanning the master image and providing a print signal pulse train to the printer which is compensated for fluctuations in the optical scanning arrangement and for variations in scanning speed of the master image, comprising:
    optical scanning means for scanning the master image along a scan line and for providing a density signal inversely related to the print density of the image along the scan line,
    reference level means for providing a signal output indicative of the maximum print density in the master image,
    summer means for subtracting said density signal from the output of said reference level means to provide a difference signal,
    integrator means, responsive to said difference signal, for integrating said difference signal during receipt of a gating signal pulse and providing an output proportional to the integral of said difference signal,
    level detector means for detecting when said integrator output has reached a predetermined level and for providing a print signal pulse to said printer and a pulse to said integrator means to reset said integrator means, a tachometer providing tachometer pulses at a frequency proportional to the rate at which the master image is scanned along the scan line, timing means, responsive to the output of said reference level means and to said tachometer pulses, for providing gating signal pulses to said integrator means of a frequency proportional to said tachometer pulses, each of said gating signal pulses being inversely proportional in duration to the output of said reference level means, whereby the print signal pulse train to said printer is compensated for fluctuations in the rate at which said master image is scanned and in the optical path of said scanner means.

3. Apparatus for scanning a master image along a scan line and encoding the image information into a print signal pulse train of a frequency proportional to the image density, comprising:

scanner transducer means for scanning said master image, including a reference image area, along a scan line, and for providing an output signal inversely related to the print density of the image, reference pulse means for providing an output reference pulse when said reference image area is being scanned, means for sampling and holding the output from said scanner transducer means in response to receipt of said reference pulse, and summer means for subtracting the output of said scanner transducer means from the output of said means for sampling and holding during scanning of said master image, thereby providing a difference signal which is directly related to the density of the image being scanned.

4. The apparatus of claim 3 further comprising:

timing integrator means, responsive to said means for sampling and holding, for providing a gating signal pulse train having pulses of a duration inversely related to the output from said optical scanner means as said reference image area is scanned, encoding integrator means, responsive to said timing integrator means and to said summer means, for integrating the output from said summer means during receipt of each pulse in said gating signal pulse train, and reference level detector means for detecting when said encoding integrator means reaches a predetermined level and for providing a pulse output for resetting said encoding integrator, whereby pulses from said encoding integrator means form said print signal pulse train.

5. The apparatus of claim 4 further comprising means for generating tachometer pulses in response to the rate at which said scanner transducer means scans said master image along said scan line and means for adjusting the frequency of said gating signal pulse train in dependence upon the frequency of said tachometer pulses.

6. Apparatus for scanning a master image along a scan line and encoding the image into a print signal pulse train of a frequency proportional to the image density, comprising:

scanner transducer means for scanning said master image along a scan line, and for providing an output inversely related to the image density, reference level means for providing a signal output indicative of the maximum image density in the master image, summer means for subtracting the output of said scanner transducer means from the output of said reference level means, thereby providing a difference signal which is directly related to the density of the image being scanned, encoding integrator means, responsive to a gating signal pulse train, for integrating the output of said summer means during receipt of each pulse in said gating signal pulse train, level detector means for detecting when the output from said integrator means reaches a predetermined level and for providing a print signal pulse to said ink jet printer and resetting said integrator means in response thereto, means for generating tachometer pulses in response to the rate at which said scanner transducer means scans said master image along said scan line, and timing means, responsive to said tachometer pulses, for providing a gating signal pulse train equal in frequency to said tachometer pulses to said encoding integrator means, whereby fluctuations in the rate at which said master image is scanned are compensated.

7. The apparatus of claim 6 further comprising:

means, responsive to said reference level means, for adjusting the duration of the pulses in said gating signal pulse train such that said pulses have a duration inversely related to the maximum print density in the master image.

8. The method of scanning and encoding a master image to provide a print signal pulse train for an ink jet printer comprising the steps of:

optically scanning a master image, including a reference image area, and providing an electrical scanning signal inversely proportional to the print density of the master image, storing the scanning signal produced during scanning of the reference image area, and subtracting the electrical scanning signal, produced by scanning the master image, from the scanning signal produced by scanning the reference image area, to provide a density signal directly related to the density of the master image.

9. The method of claim 8 including the further steps of:

integrating said density signal during selected periods of time, providing a print signal pulse to an ink jet printer when the integral of said density signal reaches a predetermined level, and initiating a new integration operation.

10. The method of claim 9 further comprising the steps of:

monitoring the scanning signal as the reference image area is scanned, monitoring the rate at which the master image is scanned, and controlling the time periods during which integration of said density signal occurs such that the integration occurs during time periods which vary in frequency according to the rate at which the master image is scanned and which time periods are inversely proportional in length to the density signal resulting from scanning said reference image area.

11. The method of scanning and encoding a master image to provide a print signal pulse train for an ink jet printer, comprising the steps of:

optically scanning the master image, generating a density signal related in amplitude to the print density of the master image, measuring the rate of scanning of the master image, integrating the density signal in accordance with the rate at which the master image is scanned, and generating print and integration reset signals when the integral of the density signal reaches a predetermined level.

* * * * *